US012623452B2

(12) United States Patent
Deboard et al.

(10) Patent No.: US 12,623,452 B2

(45) Date of Patent: May 12, 2026

(54) PIPETTE-FILLABLE CARTRIDGE FLUID DETECTION

(71) Applicant: Brady Worldwide, Inc., Milwaukee, WI (US)

(72) Inventors: Bruce A Deboard, Georgetown, KY (US); Bruce D. Gibson, Lexington, KY (US); Michael A. Marra, III, Lexington, KY (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 394 days.

(21) Appl. No.: 18/454,251

(22) Filed: Aug. 23, 2023

(65) Prior Publication Data

US 2023/0391075 A1 Dec. 7, 2023

Related U.S. Application Data

(62) Division of application No. 17/205,001, filed on Mar. 18, 2021, now abandoned.

(51) Int. Cl.

*B41J 2/045* (2006.01)
*B41J 2/14* (2006.01)

(52) U.S. Cl.

CPC ............. *B41J 2/04541* (2013.01); *B41J 2/14* (2013.01)

(58) Field of Classification Search

CPC ...... B41J 2/04541; B41J 2/14; B41J 2/17566; B41J 2/1433

See application file for complete search history.

(56) References Cited

U.S. PATENT DOCUMENTS

| | | | |
|---|---|---|---|
| 6,084,605 | A | 7/2000 | Yaji |
| 6,305,776 | B1 | 10/2001 | Ohshima et al. |
| 6,652,053 | B2 | 11/2003 | Imanaka et al. |
| 6,871,925 | B2 | 3/2005 | Yamamoto et al. |
| 7,108,348 | B2 | 9/2006 | Shinkawa et al. |
| 8,408,673 | B2 | 4/2013 | Aoki et al. |
| 8,870,322 | B2 | 10/2014 | Martin et al. |
| 8,899,709 | B2 | 12/2014 | Govyadinov et al. |
| 9,278,520 | B2 | 3/2016 | Kamiyanagi et al. |
| 9,452,604 | B2 | 9/2016 | Brocklin et al. |
| 9,493,002 | B2 | 11/2016 | Edelen et al. |
| 9,815,278 | B2 | 11/2017 | Edelen et al. |
| 10,099,477 | B2 | 10/2018 | Edelen et al. |
| 10,717,279 | B2 | 7/2020 | Edelen et al. |
| 2008/0100681 | A1 | 5/2008 | Tyvoll et al. |
| 2008/0305969 | A1 | 12/2008 | Dijksman et al. |

(Continued)

FOREIGN PATENT DOCUMENTS

| | | | | |
|---|---|---|---|---|
| CN | 101990500 A * | 3/2011 | .......... | B41J 2/17523 |
| JP | H03190748 A | 8/1991 | | |

*Primary Examiner* — Lam S Nguyen

(74) *Attorney, Agent, or Firm* — Brianna Schonenberg

(57) ABSTRACT

A digital dispense system and method of using a digital dispense system. The digital dispense system includes a pipette-fillable fluid cartridge having one or more fluid chambers therein and having an ejection head attached thereto. The ejection head contains a plurality of fluid ejectors thereon. The fluid ejectors are in fluid flow communication with the one or more fluid chambers of the pipette-fillable fluid cartridge. A fluid detection circuit is disposed on the ejection head and associated with at least one of the plurality of fluid ejectors for signaling the presence or absence of fluid in the one or more fluid chambers.

9 Claims, 7 Drawing Sheets

(56) References Cited

U.S. PATENT DOCUMENTS

| | | | |
|---|---|---|---|
| 2016/0169808 | A1 | 6/2016 | Atzler et al. |
| 2017/0120583 | A1 | 5/2017 | Edelen et al. |
| 2017/0225454 | A1 | 8/2017 | Yoshida |
| 2018/0207943 | A1 | 7/2018 | Horade |
| 2020/0108597 | A1 | 4/2020 | Oikawa et al. |
| 2020/0271679 | A1 | 8/2020 | Nakano et al. |

* cited by examiner

PIPETTE-FILLABLE CARTRIDGE FLUID DETECTION

RELATED APPLICATION

This application is a division of application Ser. No. 17/205,001, filed Mar. 18, 2021.

TECHNICAL FIELD

The disclosure is directed to a digital dispense device having a pipette-fillable cartridge and in particular to a system and method for determining the presence or absence of a fluid in a chamber of a pipette-fillable fluid cartridge.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. Assay analysis of blood, for example, provides a number of different factors that are used to determine the health of an individual. When there are a large number of patients that require blood sample analysis, the procedures may be extremely time consuming. For assay analysis, such as drug screenings, it is desirable to deposit miniscule amounts of target reagents to evaluate their effect and performance on the samples. Traditionally, pipettes—manually or electromechanically actuated—are used to deposit trace substances into these assay samples. The total volume of a test fluid produced for an assay is dictated by the ability to achieve a desired ratio of reagents with respect to the least of the reagents. Due to the small-scale volumetric limitations of pipettes, it is often necessary to create an excess of testing fluid to achieve the proper ratio of reagents.

It is well known that thermal inkjet technology is capable of precisely distributing picolitre-sized droplets of a jetting fluid. The precision and speed offered by inkjet technology makes it a promising candidate for increasing throughput of assay samples while decreasing the amount of wasted sample. In a conventional thermal-jet printer, a jetting fluid is typically prefilled into a printhead before reaching the end-user. However, it is impractical to use a prefilled cartridge in the life-sciences field where it is desirable to produce testing solutions on site.

Accordingly, a pipette-fillable cartridge may be used with the digital dispense system. Pipette-fillable cartridges are filled at the time of use with a pre-determined amount of fluid for performing a chemical assay of a sample. In some cases, the fluid is to be deposited in a well of a micro-well plate or onto a glass slide. Since the amount of fluid to be dispensed is critical to the assay analysis being performed, it is important to know if a fluid and the right amount of fluid is pipetted into a fluid chamber of a pipette-fillable cartridge. If the chamber is devoid of fluid, or prematurely runs out of fluid before the assay is complete, the sample may be ruined or provide inaccurate results. Accordingly, what is needed is an apparatus and method for notifying a user that a fluid chamber of a pipette-fillable cartridge may be devoid of fluid.

In view of the foregoing, an embodiment of the disclosure provides a digital dispense system and method of using a digital dispense system. The digital dispense system includes a pipette-fillable fluid cartridge having one or more fluid chambers therein and having an ejection head attached thereto. The ejection head contains a plurality of fluid ejectors thereon. The fluid ejectors are in fluid flow communication with the one or more fluid chambers of the pipette-fillable fluid cartridge. A fluid detection circuit is disposed on the ejection head and associated with at least one of the plurality of fluid ejectors for signaling the presence or absence of fluid in the one or more fluid chambers.

In another embodiment, there is provided a method for dispensing fluid with a digital dispense system. The method includes providing a pipette-fillable fluid cartridge having one or more fluid chambers therein and having an ejection head attached thereto. The ejection head contains a plurality of fluid ejectors thereon, wherein the fluid ejectors are in fluid flow communication with the one or more fluid chambers of the pipette-fillable fluid cartridge. A fluid detection circuit is disposed on the ejection head and associated with at least one of the plurality of fluid ejectors for signaling the presence or absence of fluid in the one or more fluid chambers. At least one of the one or more fluid chambers is filled with a fluid to be dispensed. A diagnostic function of the digital dispense system is activated to determine if the fluid to be dispensed is present in or absent from the at least one of the one or more fluid chambers. A fluid dispense sequence is activated in an absence of an error or warning from the diagnostic function.

In another embodiment, there is provided a digital dispense system that includes a pipette fillable cartridge having at least one fluid chamber therein and an ejection head in fluid flow communication with the at least one fluid chamber. The ejection head contains a plurality of fluid ejectors and a fluid detection circuit thereon. A processor is disposed in the digital dispense system and is configured with a fluid detect algorithm. The processor is in electrical communication with the fluid detection circuit for activating an error signal in the absence of fluid. A user input device is provided for modifying or terminating a fluid dispense sequence upon error signal activation.

In some embodiments, the fluid detection circuit is selected from (a) a conductivity sense circuit, (b) a thermal sense circuit, and a combination of (a) and (b). In some embodiments, the conductivity sense circuit includes a first electrode in electrical communication with at least one of the plurality of fluid ejectors, and a second electrode is disposed in a fluid flow path to at least one of the plurality of fluid ejectors. In other embodiments, the thermal sense circuit includes a voltage slope detect circuit for at least one of the plurality of fluid ejectors.

In some embodiments, the fluid cartridge comprises two or more discrete fluid chambers.

In some embodiments, the ejection head comprises two or more arrays of fluid ejectors thereon and at least one fluid ejector from each of the two or more arrays of fluid ejectors is associated with the fluid detection circuit.

In some embodiments, the fluid dispense sequence is modified in the presence of an error or warning from the diagnostic function that indicates an incorrect fluid in the at least one of the one or more fluid chambers.

In some embodiments, the fluid dispense sequence is modified in the presence of an error or warning from the diagnostic function that indicates that fluid is absent from the at least one of the one or more fluid chambers.

In some embodiments, the fluid dispense sequence is terminated in the presence of an error or warning from the diagnostic function that indicates that fluid is absent from the at least one of the one or more fluid chambers.

In some embodiments, the fluid detect algorithm is programmed to use (a) fluid conductivity data, (b) ejector thermal data, or a combination of (a) and (b) to determine if a fluid is present in the at least one fluid chamber.

In some embodiments, the fluid detect algorithm is programmed to (i) use fluid conductivity data initially and to (ii) use ejector thermal data if fluid is not found by step (i).

In some embodiments, the pipette-fillable cartridge contains two or more fluid chambers and the fluid detect algorithm is programmed to determine if a fluid is absent from a predetermined one of the two or more fluid chambers.

In some embodiments, the fluid detect algorithm is programmed to determine when the at least one fluid chamber runs out of fluid.

An advantage of the disclosed embodiments is that it provides unique low-cost pipette-fillable cartridges that provide feedback to a user if fluid chambers of the cartridge do not contain fluid or an incorrect fluid is pipetted into a fluid chamber. Other advantages of the embodiments enable a user to determine if the correct amount of fluid was pipetted into a fluid chamber for a particular analysis job. Feedback provided by the system disclosed herein may be used to correct errors before beginning a fluid dispense job.

DETAILED DESCRIPTION OF EXEMPLARY EMBODIMENTS

Figure 1:
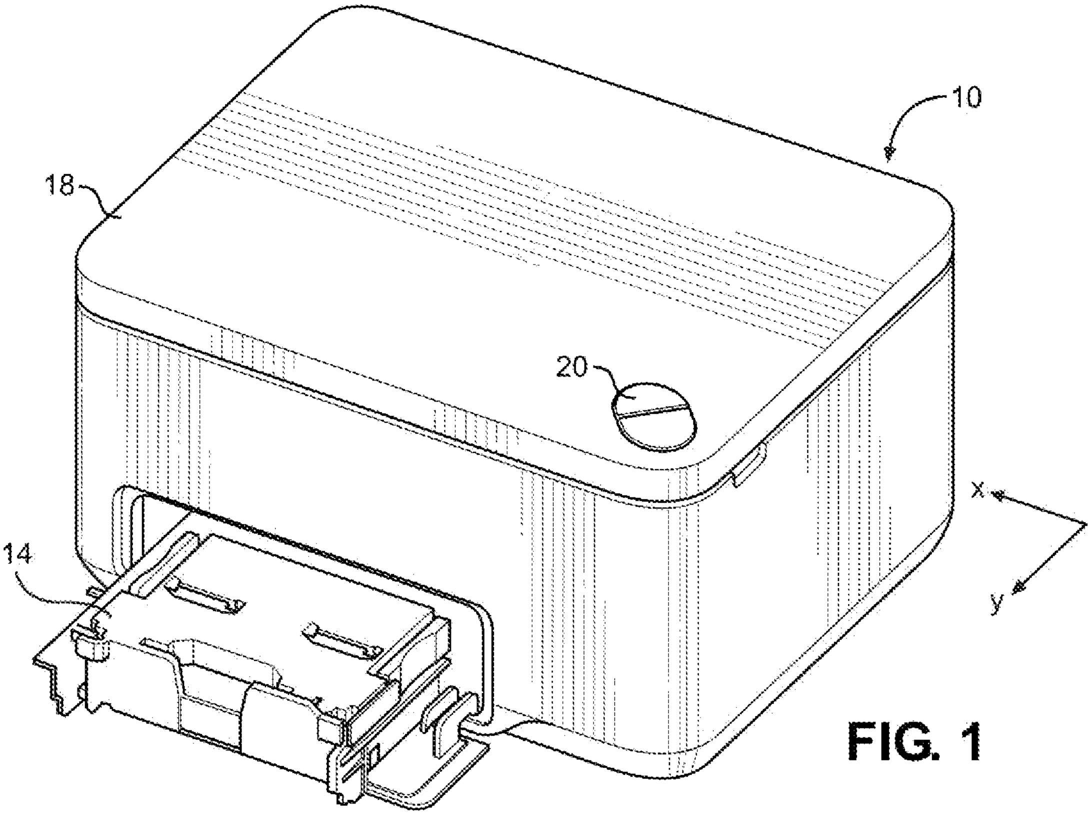
FIG. 1 is a perspective view, not to scale, of a digital dispense system according to an embodiment of the disclosure.
Figure 2:
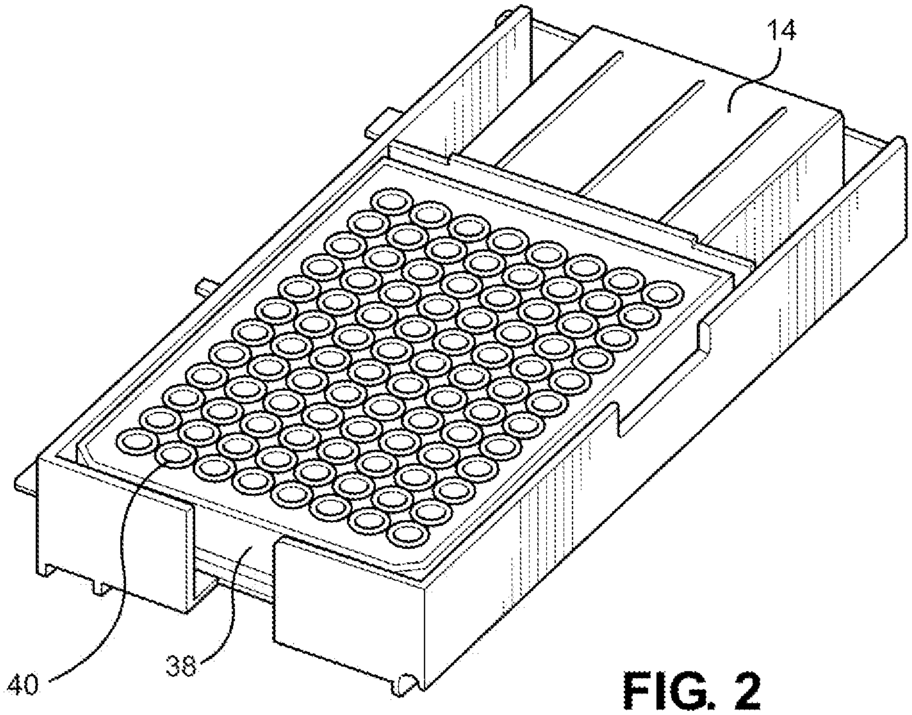
FIG. 2 is a perspective view, not to scale, of a tray and microwell plate for use with the digital dispense system of FIG. 1.

With reference to FIGS. 1-2 there is shown a digital dispense device 10 for accurately dispensing an amount of one or more fluids onto a substrate. Unlike the high-end digital dispense devices, the device 10 of the present invention is based on an ejection head that moves back and forth in a first x direction and a tray 14 for moving a substrate that moves back and forth in a second y direction orthogonal to the first direction during the fluid dispense operation. The tray 14 is adaptable to a wide variety of substrates including, but not limited to, micro-well plates, glass slides, electronic circuit boards and the like. FIG. 2 illustrates a tray 14 for holding a micro-well plate 38 containing wells 40 therein for use with the digital dispense device 10 to dispense fluid into the wells 40 of the micro-well plate or onto the glass slides. The tray 14 may include adapters for different size micro-well plates or for holding slides or other substrates for deposit of fluid thereon.

The dispense head cartridge containing a fluid ejection head and a cartridge movement mechanism are contained in a rectangular prism-shaped box 18. An activation switch is included on the box 18 for activating the device 10. A rear side of the box 18 includes an opening for movement of the tray 14 through the box 18 in the second direction to dispense fluid onto a substrate. A USB port is provided on the box 18 to connect the digital dispense system 10 to a computer or a digital display device. Power is provided to the system 10 through a power input port on the box 18.

Figure 3:
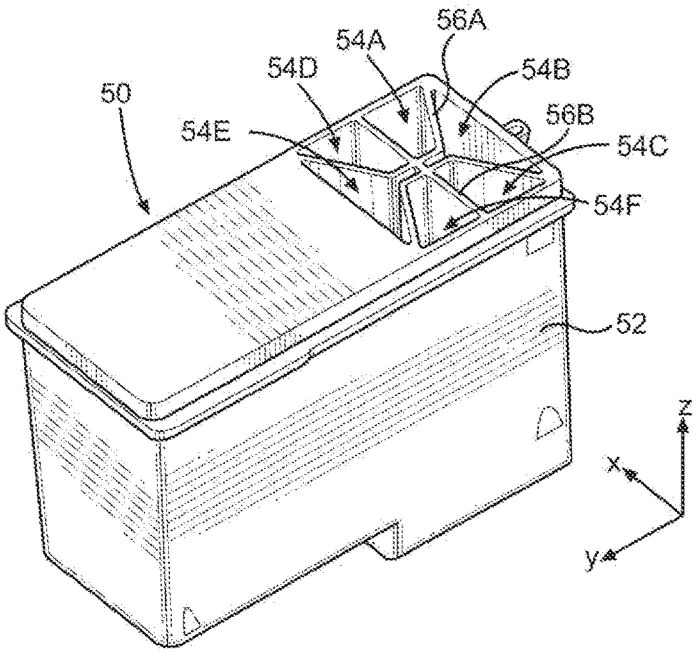
FIG. 3 is a perspective view, not to scale, of a pipette-fillable cartridge for use with the digital dispense system of FIG. 1.
Figure 4:
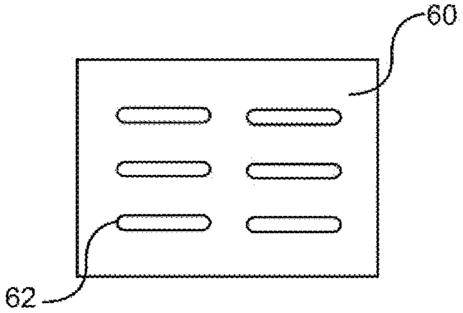
FIG. 4 is a plan view, not to scale, of an ejection head for the pipette-fillable cartridge of FIG. 3.
Figure 5:
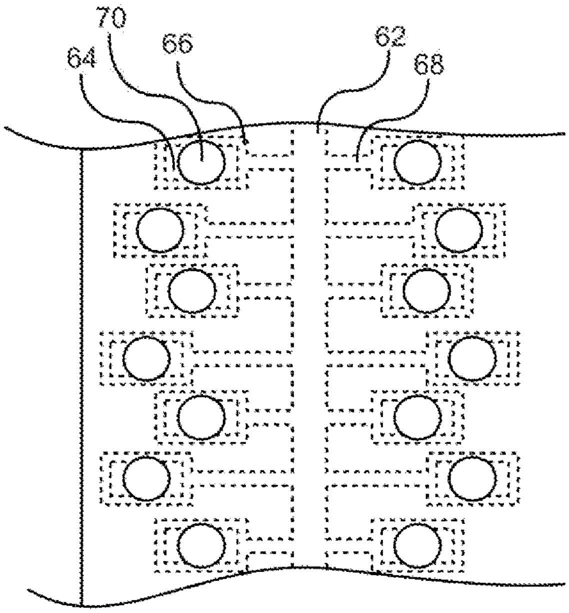
FIG. 5 is an enlarged plan view, not to scale of a portion of an ejector array on the ejection head of FIG. 4.

A pipette-fillable cartridge 50 for use with the digital dispense device 10 of FIG. 1 is illustrated in FIG. 3. The cartridge 50 has a molded body 52 that provides one or more open fluid chambers 54*a*-54*f* therein. The fluid chambers 54*a*-54*f* are separated from one another by dividing walls 56A and 56B. Each of the fluid chambers 54*a*-54*f* is associated with a fluid via for providing fluid to an array of fluid ejectors on an ejection head. With reference to FIG. 4, an ejection head 60 containing six fluid vias 62 and associated arrays of fluid ejectors is shown. A greatly magnified portion of the ejection head 60 is illustrated in more detail in FIG. 5. Each fluid via 62 provides fluid from one of the fluid chambers 54*a*-54*f* to arrays of fluid ejectors 64 disposed on one or both sides of the fluid via 62. The fluid ejectors are located in a fluid ejection chamber 66. Fluid is provided from the fluid via 62 through a fluid channel 68 to the fluid ejection chamber 66. Upon activation of the fluid ejector 64, fluid is dispensed through an ejection nozzle 70 to a substrate which may be the well 40 of the micro-well plate 38 or to a glass slide.

Figure 6:
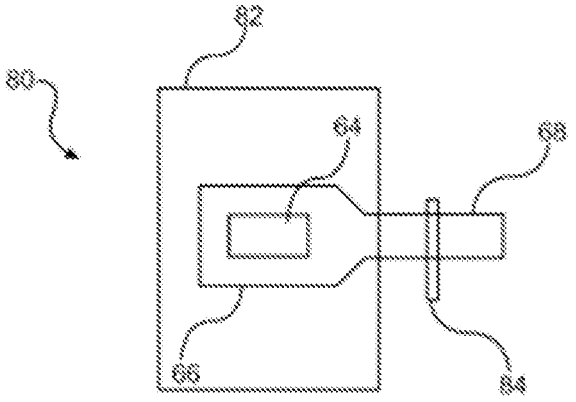
FIGS. 6 and 7 are schematic views not to scale of a fluid detect circuit without and with fluid according to an embodiment of the disclosure.

In order to determine if the fluid chambers 54*a*-54*f* contain fluid, a fluid detection circuit selected from one or more of a conductivity sense circuit and/or a thermal sense circuit may be used. A conductivity detection device 80 is illustrated in a simplified plan view in FIG. 6 of a single fluid ejection chamber 66 containing electrodes 82 and 84. Electrode 82 may be a tantalum protective layer disposed over the fluid ejector 64. A second electrode 84 is disposed in the fluid channel 68 for fluid from the fluid via 62 to the fluid ejection chamber 66. Each of the electrodes 82 and 84 may be made of a metal such as tantalum which is resistant to the fluids dispensed by the digital dispense device 10. Accordingly, any suitable metal may be used as electrodes 82 and 84. At least one electrode 82 and one electrode 84 may be provided for each array of fluid ejectors 64 on the ejection head 60.

Figure 7:
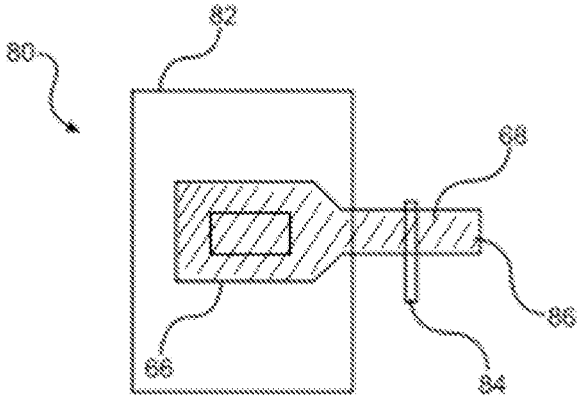
Figure 8:
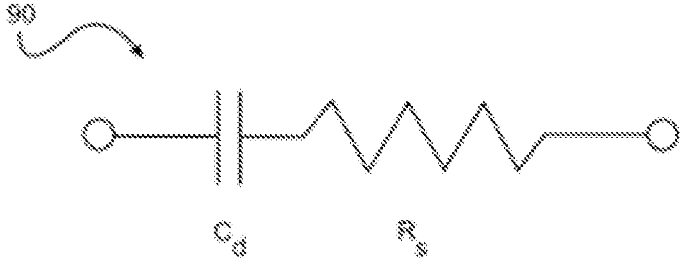
FIG. 8 is a schematic diagram of the fluid detect circuit of FIGS. 6 and 7.

FIG. 7 shows the conductivity detection device 80 in a steady state with the fluid chamber 66 and fluid channel 68 filled with fluid 86. As shown, the first electrode 82 and second electrode 84 are now fluidly connected by means of a conductive fluid 86. It is known from electrochemical principles that the relationship between the fluid and the first and second electrodes 83 and 84 can be represented by an electrical circuit 90 with a resistor, Rs, representing the solution resistance and the capacitor, Cd, representing the double layer capacitance formed at the electrode to fluid interface when biased as shown in FIG. 8. It should be understood that in the case where a conductive liquid is not present the double layer capacitor does not exist, and the series resistance would appear as an open circuit 90.

Figure 9:
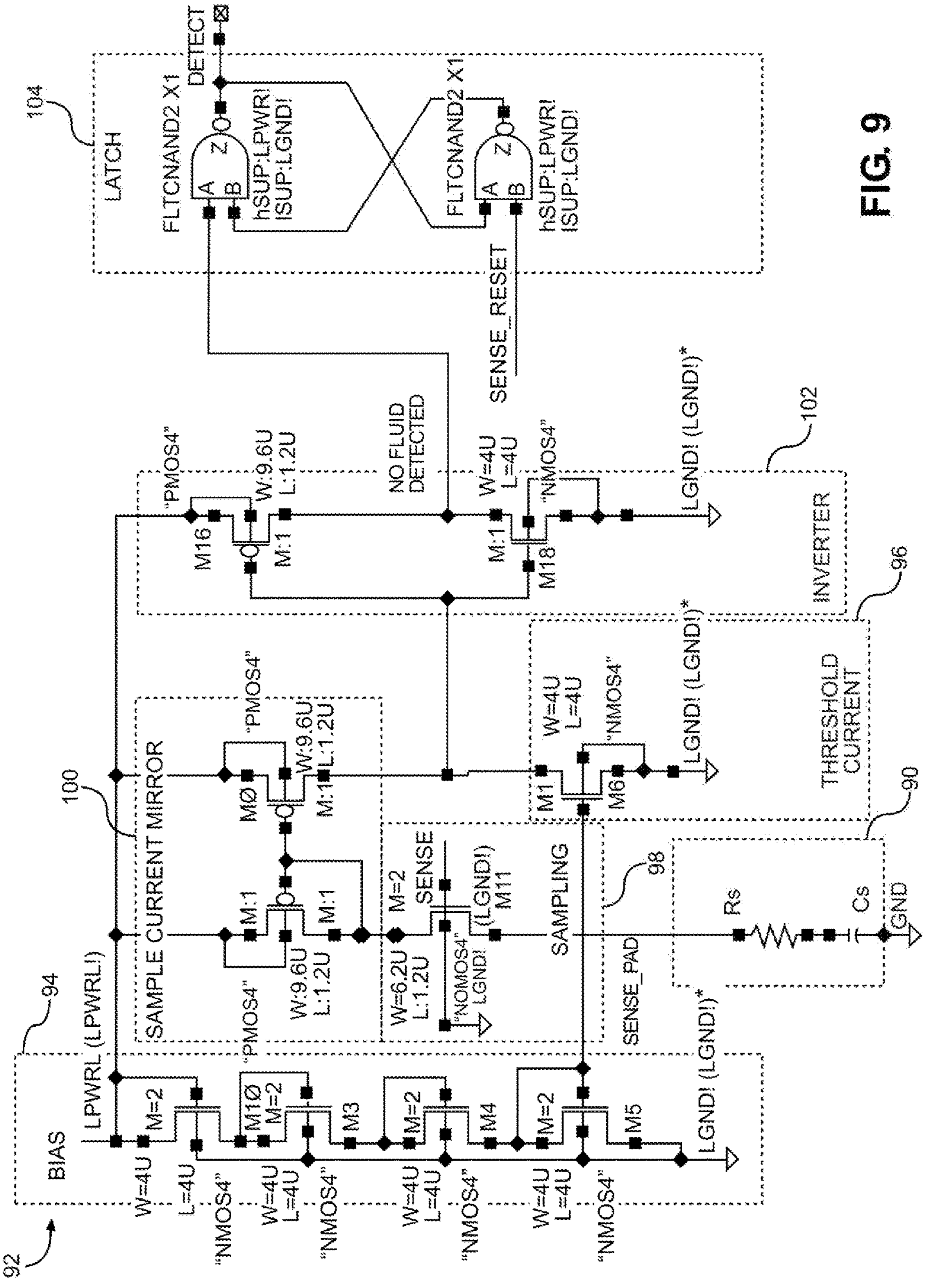
FIG. 9 is schematic diagram of a voltage change circuit for use with the fluid detect circuit of FIGS. 6 and 7.

In an exemplary embodiment, a voltage step is applied to the circuit 90 and the resulting response is used to sense the presence or absence of liquid. An exemplary circuit 92 for making a voltage change measurement using the conductivity detection device 80 is illustrated in FIG. 9. The circuit 92 provides a digital high output when fluid is present in the conductivity detection device 80 and a digital low output when the detection device 80 is devoid of fluid.

The circuit 92 may be grouped into seven functional blocks. The bias block 94 develops a current bias used by the threshold detection block 96. The sampling block 98 connects the sampling pad to the sample current mirror 100 when the sense pin is at a high state. The sample current mirror 100 then replicates the fluid current sensed and the current flows into the threshold current detection block 96. If the mirrored current sensed is greater than the threshold current then fluid is present and the inverter block 102 produces a low state at the input of the latch block 104 and the latch block detect pin will go to a high state. The latch is required because of the transient charging nature of the current that flows through the fluid. If fluid is not present then the sampled current will be much less (almost zero) than the threshold detect current. The inverter will then produce a high state which also produces a low state at the latch detect output. The latch is a memory element and its state will persist until its sense_reset pin is forced to a high state. The high state of the sense_reset pin will clear the latch's detect output pin to a low state. In summary, a transient current pulse through the fluid causes the latch to trigger and its detect output pin will be latched at a high state or the "fluid sensed" state.

While the foregoing conductivity detection device 80 may be applied to all of the fluid ejectors in an array of fluid ejectors 64, a single conductivity detection device 80 may be used for each array of fluid ejectors 64. Accordingly, if fluid is not sensed by the conductivity detection device 80 for a single array of fluid ejectors, a warning signal may be sent by a processor in the digital dispense system to a user as described in more detail below.

For fluids that are non-conductive, the conductivity detection device 80 may not be suitable for detecting the presence or absence of fluid in a fluid chamber 54*a*-54*f*. Accordingly, a backup fluid detection circuit may also be included on the ejection head 60. In this embodiment, the fluid ejectors 64 are thermal fluid ejectors that are used to heat a fluid and create a vapor bubble in the fluid chamber 66. The formation of a bubble on a surface of the thermal fluid ejectors is detected based on the slope change in the current passing through the fluid ejector 64. If no fluid is present on the surface of the thermal fluid ejector, the rate at which the surface of the fluid ejector 64 is heated will increase. By detecting a change in the rate of heating of the ejector surface, the presence or absence of fluid can be detected.

Figure 10:
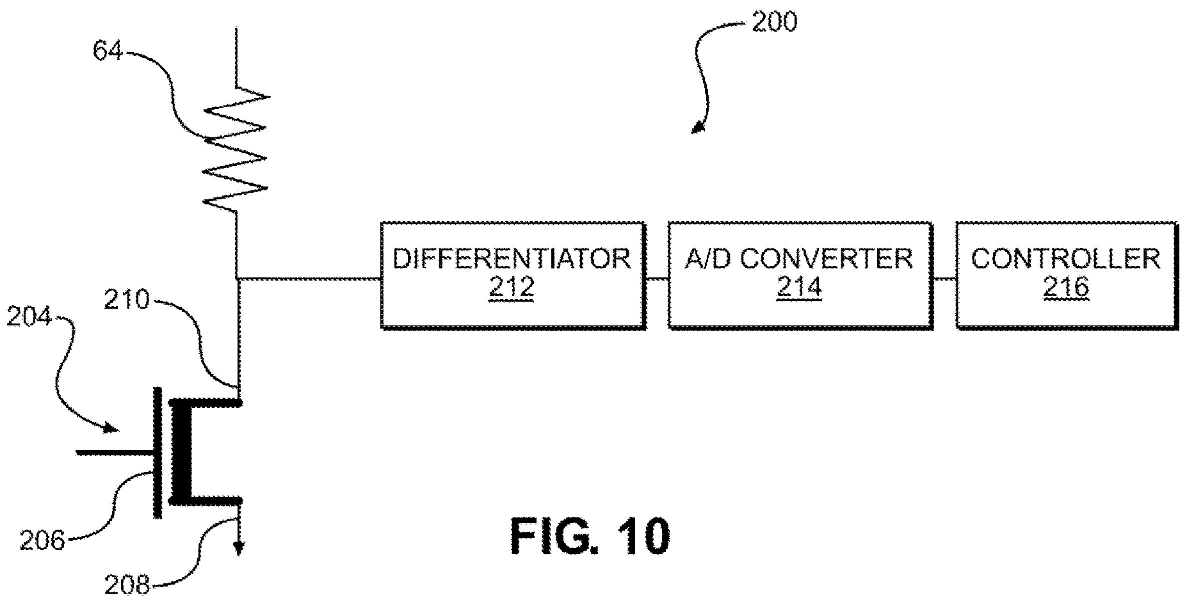
FIGS. 10 and 11 are schematic diagrams of thermal detect circuits according to a second embodiment of the disclosure.

FIG. 10 is a block diagram of thermal sense circuit 200 for a fluid detection device according to another embodiment of the disclosure. The thermal sense circuit 200 includes a differentiator 212, and A/D converter 214 and a controller 216. The theral sense circuit 200 is configured to sense the voltage at the drain of the power FET of the driving element of at least one fluid ejector 64 of a fluid ejector array. In FIG. 10, the fluid ejector 64 is shown (represented as a resistor) including a corresponding driving element 204. The driving element 204 is preferably a MOSFET driving element, including a polysilicon gate 206, source 208, and drain 210. Each driving element is operable to selectively enable the fluid ejector 64 according to a logic structure provided by a controller 216 in the digital dispense system 10.

The differentiator 212 is electrically connected to the drain 210 of the driving element 204. The differentiator 212 serves to enhance the small slope change of a voltage that occurs at the time of fluid bubble formation on the surface of the fluid ejector 64. For example, assume that a fluid ejector 64 having a sheet resistance of 350 ohms/sqr and a negative temperature coefficient of −320 ppm is used for the thermal sense circuit 200. At the time of a bubble formation on the surface of the fluid ejector 64, there is a slight increase in the slope of the fluid ejector current. While the slope change is small, it is detectable using a measuring socilloscope to determine the exact time when the change in fluid ejector current occurs. The fluid sense circuit 200 senses the current through the fluid ejector 64 in order to sense bubble formation.

In another embodiment, the voltage at the drain of the power FET is sensed. As with the measured current previously discussed, the slope change of the voltage is small and is best enhanced by a differentiation of the value by the differentiator 212. The differentiator 212 may be any suitable differentiator circuit known in the art and may include circuit components such as, for example, capacitors and operational amplifiers.

The output of the differentiator 212 is sent to the A/D converter 214, the output of which is then sent to the controller 216. The controller 216 may be configured to remove power from the heater 202 if no fluid is detected. In this way, the thermal sense circuit 200 may be used to determine the condition of the fluid ejector. For example, by programming the controller 216 with preset values for voltage slope change and times, the thermal sense circuit 200 can determine whether a voltage slope change actually occurs, and if so, whether the slope change matches the programmed value and timing. Any deviation from the programmed values would indicate that fluid is absent from the surface of the fluid ejector 64.

The controller 216 may be configured to disable a fire pulse when the absence of fluid is dectected, or may be configured to alert the user that the fluid chamber 54*a*-54*f* is devoid of fluid. In this regard, when a slope change is detected, the differentiator 212 may output a logic high or digital 1. When this value is inverted and then ANDed with the fire pulse the result is that the signal is gated and the power FET device is turned off.

Figure 11:
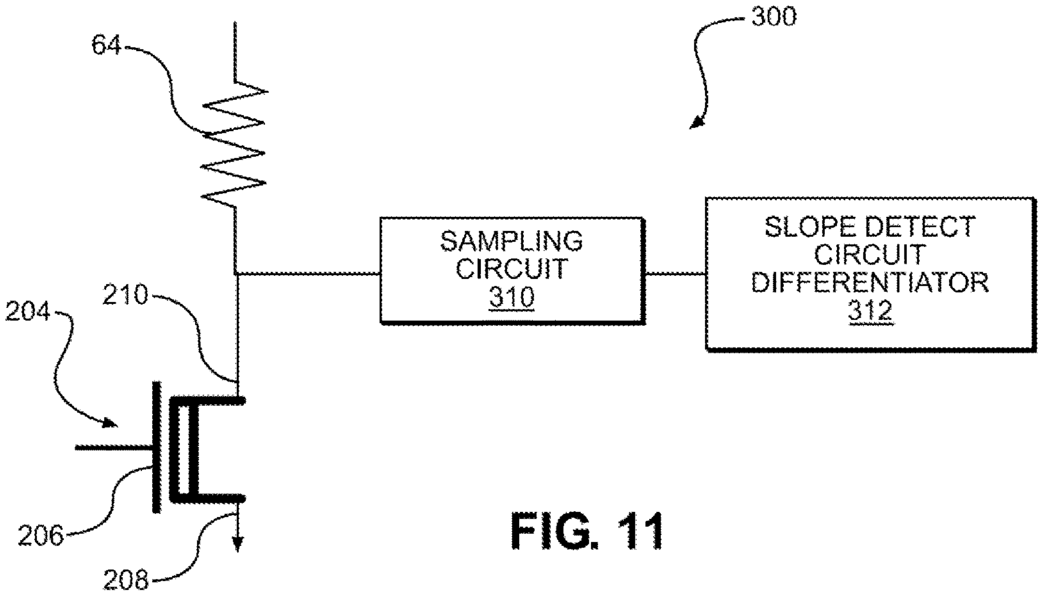
Figure 12:
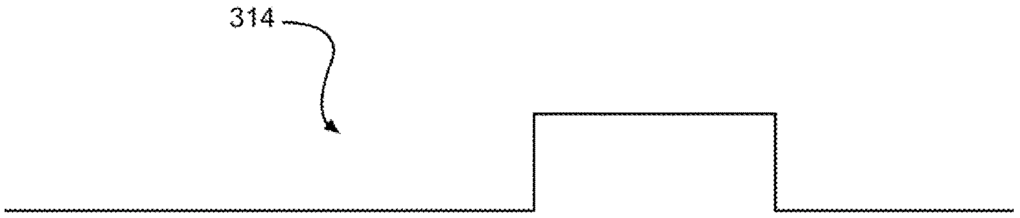
FIG. 12 is a schematic view of a digital output from the thermal sense circuits of FIGS. 10 and 11.

FIG. 11 is a block diagram of an alternative thermal sense circuit 300 for a fluid detection circuit according to another exemplary embodiment of the disclosure. The thermal sense circuit 300 includes a sampling circuit 310 and a slope detect circuit differentiator 312. As shown, the voltage is sampled at the transistor drain node as described above, but in the present embodiment the drain voltage is passed as an input to the sampling circuit 310. The sampling circuit 310 can be a switched capacitor circuit with an analog output or an A/D circuit with a digital output. The output value from the sampling circuit 310 is fed into the slope detect circuit differentiator 312 which performs a sample to sample differentiation of the signal. A sudden change in slope is detected within the slope detect circuit differentiator 312 and converted to a digital output 314 as shown in FIG. 12. As in the previous embodiment, the slope detect circuit differentiator 312 may output a logic high or digital 1 which is used to turn the power MOS FET off and signal the user that the fluid chamber is devoid of fluid.

It will be appreciated that one or both of the fluid detect circuits may be used for the pipette-fillable cartridge 50 described above. The fluid detect circuits may be used individually or sequentially, or the system may be programmed to use one fluid detect circuit for one fluid and a different fluid detect circuit for a different fluid. In some embodiments, a conductivity detect circuit may be used first to detect the presence or absence of fluid, and if no fluid is detected, a thermal sense circuit will then be used to detect the presence or absence of fluid. If one or more fluid chambers 54*a*-54*f* contain fluid, the fluid will flow into the ejection head 60 from the fluid via 62 to fill the fluid channel 68 and fluid chamber 66. Upon activation of the fluid ejector 64, fluid will then be ejected through the fluid nozzle 70 to a substrate such as the well of the mico-well plate or onto a glass slide. If no fluid is present in the fluid chamber, then the fluid detect circuit will be activated to notify the user of a problem.

Figure 13:
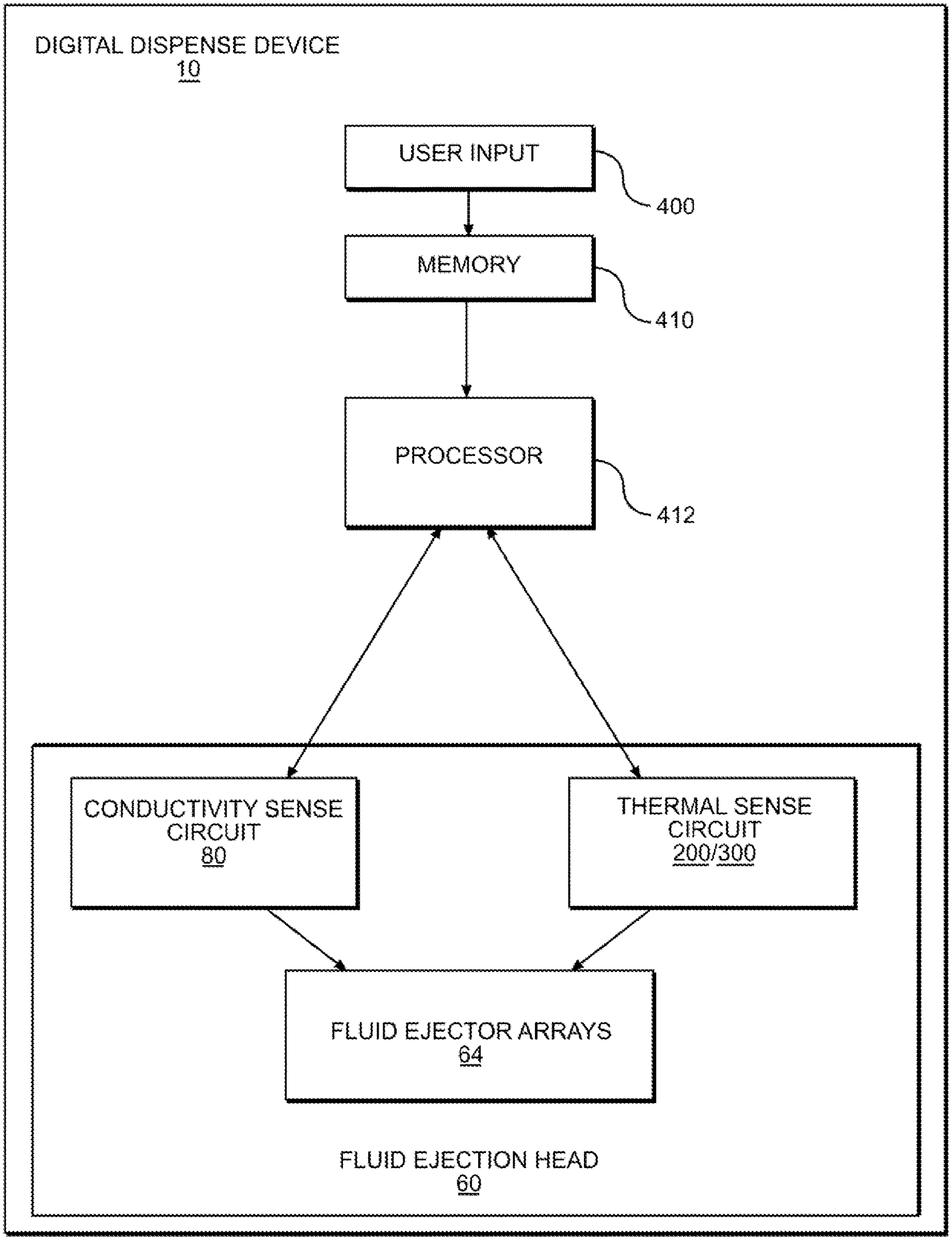
FIG. 13 is a block diagram of the digital dispense system of FIG. 1

FIG. 13 is a block diagram of a digital dispense system 10 having a user input block 400 for inputting fluid information, fluid chamber information, fluid dispense location, fluid dispense volume, fluid chamber volume, and substrate type into a memory 410 of the device 10. The processor 412 is configured with an algorithm that uses the memory information and feedback from the fluid detection circuits 80, 200 or 300 to control the fluid ejectors 64 on the ejection head 60.

Figure 14:
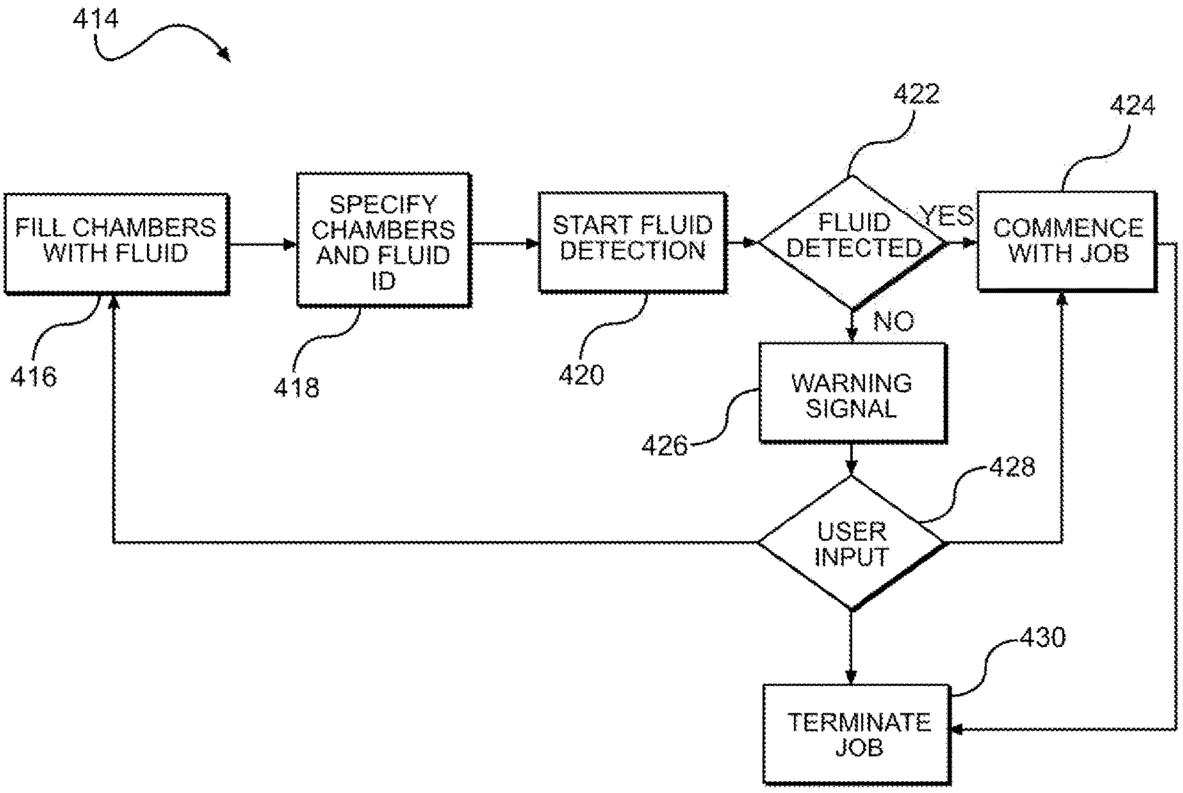
FIG. 14 is a process flow diagram for the fluid sense circuits according to embodiments of the disclosure.

As shown in FIG. 14, a first step 416 of the process 414 of dispensing fluid by the digital dispense device 10 is to fill one or more fluid chambers 54*a*-54*f* with fluid using a pipette. The user also specifies the fluid chamber(s) that contain fluid and the identification of which fluid is in which fluid chamber in step 418. Once the information is stored in the memory 410 (FIG. 13), step 420 is initiated either manually or automatically to detect whether or not fluid is present in the specified fluid chamber(s) using one or both of the fluid detect circuits described above. If the fluid is conductive, then the processor activates the conductivity detection device 80 to determine if fluid is present. If no fluid is detected because the specified fluid chamber(s) is empty or the fluid is non-conductive, then the processor activates the thermal sense circuit 200/300 to determine if fluid is present in the specified fluid chamber(s). If fluid is detected in the correct fluid chambers in step 422, then the dispense job commences in step 424 until the job is complete and terminated in step 430. However, if there is no fluid present in the specified fluid chamber(s) or the fluid is determined to be in the incorrect fluid chamber(s), an error signal is provided in step 426 requiring the user to intervene in the process in step 428. The user may terminate the dispense job in step 430, or correctly fill the chambers in step 416 and/or specify which fluid is in which chamber in step 418.

For example, if fluid is supposed to be pipetted into fluid chamber 54*a* and the user mistakenly pipettes fluid into fluid chamber 54*b*, the fluid detection circuit can detect that fluid chamber 54*a* is devoid of fluid and can detect that chamber 54*b* contains fluid. The processor can display a warning that an error occurred and allow the user to fix the error before proceeding to step 424. In the alternative, the processor can be programmed to virtually move the fluid data from fluid chamber 54*a* to fluid chamber 54*b* automatically or upon input by the user. The processor could also be programmed to continuously check for fluid in each of the fluid chambers during the dispense operation to determine if a chamber runs out of fluid before the fluid dispense operation is complete. Information about the amount of fluid used and the history of fluid ejected from individual fluid chambers may be stored in the memory for future reference or for troubleshooting fluid dispense operations.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method for dispensing fluid with a digital dispense system, comprising:

providing a pipette-fillable fluid cartridge having one or more discrete fluid chambers therein and having an ejection head attached thereto, the ejection head containing an array of fluid ejectors thereon for each of the one or more discrete fluid chambers, wherein each array of fluid ejectors is in fluid flow communication with one of the one or more discrete fluid chambers of the pipette-fillable fluid cartridge; a user input configured for initiating, modifying or terminating a fluid dispense sequence; and a fluid detection circuit disposed on the ejection head, the fluid detection circuit being in electrical communication with each array of fluid ejectors and configured for signaling to a user the presence or absence of fluid in the one or more discrete fluid chambers;

filling at least one of the one or more fluid chambers with a fluid to be dispensed;

activating a diagnostic function of the digital dispense system to determine if the fluid to be dispensed is present in or absent from the at least one of the one or more fluid chambers using (A) fluid conductivity data, (B) ejector thermal data, or a combination of (A) and (B) to determine if a fluid is present in the at least one of the one or more fluid chambers, wherein (i) initially fluid conductivity data is used and if fluid is not found by (i), then (ii) ejector thermal data is used; and subsequent to the diagnostic function, selecting one of following steps selected from the group consisting of:

a) initiating a fluid dispense sequence in an absence of an error or warning to the user;

b) modifying the fluid dispense sequence in the presence of an error or warning that indicates an incorrect fluid in the at least one of the one or more discrete fluid chambers;

c) modifying the fluid dispense sequence in the presence of an error or warning that indicates that fluid is absent from at least one of the one or more discrete fluid chambers; and d) terminating the fluid dispense sequence in the presence of an error or warning that indicates that fluid is absent from at least one of the one or more discrete fluid chambers.

2. The method of claim 1, wherein the fluid detect algorithm is programmed to (i) use fluid conductivity data from a conductivity sense circuit, wherein the conductivity sense circuit comprises a first electrode in electrical communication with at least one fluid ejector in each array of fluid ejectors, and a second electrode disposed in a fluid flow path to the at least one fluid ejector.

3. The method of claim 1, wherein the fluid detect algorithm is programmed to (ii) use ejector thermal data from a thermal sense circuit, wherein the thermal sense circuit comprises a voltage slope detect circuit for at least one array of fluid ejectors.

4. A digital dispense system comprising:

a pipette fillable cartridge having one or more discrete fluid chambers therein and an ejection head having an array of fluid ejectors for each of the one or more discrete fluid chambers, wherein each array of fluid ejectors is in fluid flow communication with one of the one or more discrete fluid chambers, wherein the ejection head contains a fluid detection circuit in electrical communication with each array of fluid ejectors;

a processor disposed in the digital dispense system configured with a fluid detect algorithm, wherein the processor is in electrical communication with the fluid detection circuit and is configured for activating an error signal in the absence of fluid in at least one of the one or more discrete fluid chambers; and a user input device configured for initiating, modifying, or terminating a fluid dispense sequence upon error signal activation, wherein the fluid detect algorithm is programmed to use (a) fluid conductivity data, (b) ejector thermal data, or a combination of (a) and (b) to determine if a fluid is present in each of the one or more discrete fluid chambers, and the fluid detect algorithm is programmed to (i) use fluid conductivity data initially, and to (ii) use ejector thermal data if fluid is not found by (i).

5. The digital dispense system of claim 4, wherein the fluid detect algorithm is programmed to (i) use fluid conductivity data from a conductivity sense circuit.

6. The digital dispense system of claim 5, wherein the conductivity sense circuit comprises a first electrode in electrical communication with at least one fluid ejector in each array of fluid ejectors, and a second electrode disposed in a fluid flow path to the at least one of the fluid ejector in each array of fluid ejectors.

7. The digital dispense system of claim 4, wherein the fluid detect algorithm is programmed to determine if a fluid is absent from a predetermined one of the one or more discrete fluid chambers.

8. The digital dispense system of claim 4, wherein the fluid detect algorithm is programmed to determine when at least one fluid chamber of the one or more discrete fluid chambers runs out of fluid.

9. The digital dispense system of claim 4, wherein the fluid detect algorithm is programmed to determine if an incorrect fluid is in the at least one of the one or more discrete fluid chambers.

* * * * *